United States Patent [19]
Lee et al.

[11] Patent Number: 5,467,238
[45] Date of Patent: Nov. 14, 1995

[54] CLEANING APPARATUS FOR HEADS OF DATA STORAGE DISKS

[75] Inventors: Neville K. Lee, Sherborn; Hisashi Katao, Shrewsbury, both of Mass.

[73] Assignee: Quantum Corporation, Milpitas, Calif.

[21] Appl. No.: 293,106

[22] Filed: Aug. 19, 1994

Related U.S. Application Data

[63] Continuation of Ser. No. 88,293, Jul. 6, 1993.

[51] Int. Cl.⁶ ........................................... G11B 5/41
[52] U.S. Cl. ............................................... 360/128
[58] Field of Search .......................... 369/71, 72, 219; 360/128

[56] References Cited

U.S. PATENT DOCUMENTS

| | | | |
|---|---|---|---|
| 3,731,289 | 5/1973 | Bajgert et al. | 340/174 |
| 3,881,734 | 5/1975 | Leedom | 274/1 |
| 3,964,104 | 6/1976 | Herron et al. | 360/128 |
| 4,166,623 | 9/1979 | Nanbu et al. | 274/1 |
| 4,198,060 | 4/1980 | Dixon et al. | 369/72 |
| 4,285,524 | 8/1981 | Hughes et al. | 369/71 |
| 4,324,014 | 4/1982 | Stutz, Jr. et al. | 360/128 |
| 4,408,315 | 10/1983 | Mehrotra et al. | 369/71 |
| 4,450,548 | 5/1984 | Hughes | 369/71 |
| 4,470,089 | 9/1984 | Hutchins et al. | 360/128 |
| 4,486,798 | 12/1984 | Feliss et al. | 360/103 |
| 4,490,766 | 12/1984 | Hill et al. | 360/137 |
| 4,614,984 | 9/1986 | Tezuka | 360/105 |
| 4,816,942 | 3/1989 | Tanishima et al. | 360/105 |
| 4,817,078 | 3/1989 | Iwata | 369/71 |
| 5,023,971 | 6/1991 | Pompe | 15/97.1 |
| 5,027,241 | 6/1991 | Hatch et al. | 360/105 |
| 5,040,160 | 8/1991 | Moriya | 369/71 |
| 5,170,304 | 12/1992 | Katohno et al. | 360/128 |
| 5,204,793 | 4/1993 | Plonczak | 360/105 |
| 5,237,477 | 8/1993 | Hodapp et al. | 360/128 |

FOREIGN PATENT DOCUMENTS

| | | | |
|---|---|---|---|
| 56-22209 | 3/1981 | Japan . | |
| 61-236041 | 10/1986 | Japan | 369/71 |
| 359824 | 3/1991 | Japan | 369/71 |
| 4-61612 | 2/1992 | Japan . | |
| 474323 | 3/1992 | Japan | 369/71 |
| 4172630 | 6/1992 | Japan | 369/71 |
| 4-298811 | 10/1992 | Japan . | |

Primary Examiner—John H. Wolff
Assistant Examiner—David L. Ometz
Attorney, Agent, or Firm—David B. Harrison; John Chen

[57] ABSTRACT

A cleaning apparatus for cleaning a read/write head of a data storage disk. The cleaning apparatus comprises a mounting base mounted adjacent to the disk. The base includes a V-shaped lever mechanism for rotating a cleaning pad. The V-shaped lever mechanism is activated by an actuator arm for positioning the read/write head as the arm moves the read/write head across a cleaning surface of the pad. A loading ramp is used to vertically position the head relative to the cleaning pad. The V-shaped lever mechanism can be used with either a rotary or linear actuator. The cleaning pad can have a brush with bristles, or a foamed backed cloth. The cleaning pad is particularly suited for read/write heads having a grooved air-bearing surface likely to collect dust.

5 Claims, 10 Drawing Sheets

CLEANING APPARATUS FOR HEADS OF DATA STORAGE DISKS

This application is a continuation of application Ser. No. 08/088,293, filed Jul. 6, 1993.

FIELD OF THE INVENTION

This invention relates to heads used with data storage disks, and more particularly to an apparatus for cleaning a head.

BACKGROUND OF THE INVENTION

It is well known that low-mass, thin film heads are used with data storage disks for reading or writing data on a recording layer of a disk. Typically, the head "flies" above the surface of the disk at a very low "altitude." The height of the air gap between the head and the disk is usually measured in fractions of microns.

Two methods for positioning the head relative to the disk are rotary and linear actuators. With a rotary actuator, a pivotable arm moves the head in an arc relative to the disk. With a linear actuator, the head travels in a linear direction along a radial axis of the disk.

For disks storing data using magnetic effects, the head usually includes an RF coil for transmitting and receiving a magnetic field to write and read in the recording layer. For disks storing data using optical effects, the head can include an objective lens to focus a light beam at the recording layer.

With low-flying heads, dust in the environment is a serious problem. Dust particles can cause catastrophic "head crashes" destroying the head and disk. Also, significant amounts of dust can accumulate on the head to interfere with the magnetic or optical effects.

Therefore, it is desired that an apparatus be provided which allows for the cleaning of heads.

SUMMARY OF THE INVENTION

There is provided a cleaning apparatus for cleaning a read/write head used for accessing data stored on a recording disk of a disk drive. The cleaning apparatus comprises a mounting base positioned adjacent to the disk. The base includes a rachet mechanism for rotating a cleaning pad mounted thereon. The ratchet mechanism is activated by an actuator arm for positioning the read/write head. The ratchet mechanism rotates the cleaning pad while the actuator unloads the read/write head from the disk. A loading ramp is used to vertically position the read/write head relative to a cleaning surface of the cleaning pad.

The rachet mechanisms can be used with either a rotary or linear actuator. The cleaning pad can have a brush with bristles, or the cleaning pad can be a foamed backed cloth. The cleaning surface of the cleaning pad is arranged to face the surface of the head which normally faces the recording surface of the disk. The cleaning pad is particularly suited for heads having a grooved air-bearing surface likely to collect dust. In an alternative embodiment, the cleaning pad is mounted on a pivotable arm, the arm is pivoted by the actuator when the actuator unloads the read/write from the disk.

BRIEF DESCRIPTION OF THE DRAWINGS

These and other features and advantages of the present invention will become apparent from a reading of the detailed description in conjunction with the attached drawings in which like reference numerals refer to like elements in the several views, wherein.

DETAILED DESCRIPTION OF THE PREFERRED EMBODIMENT

Figure 1:
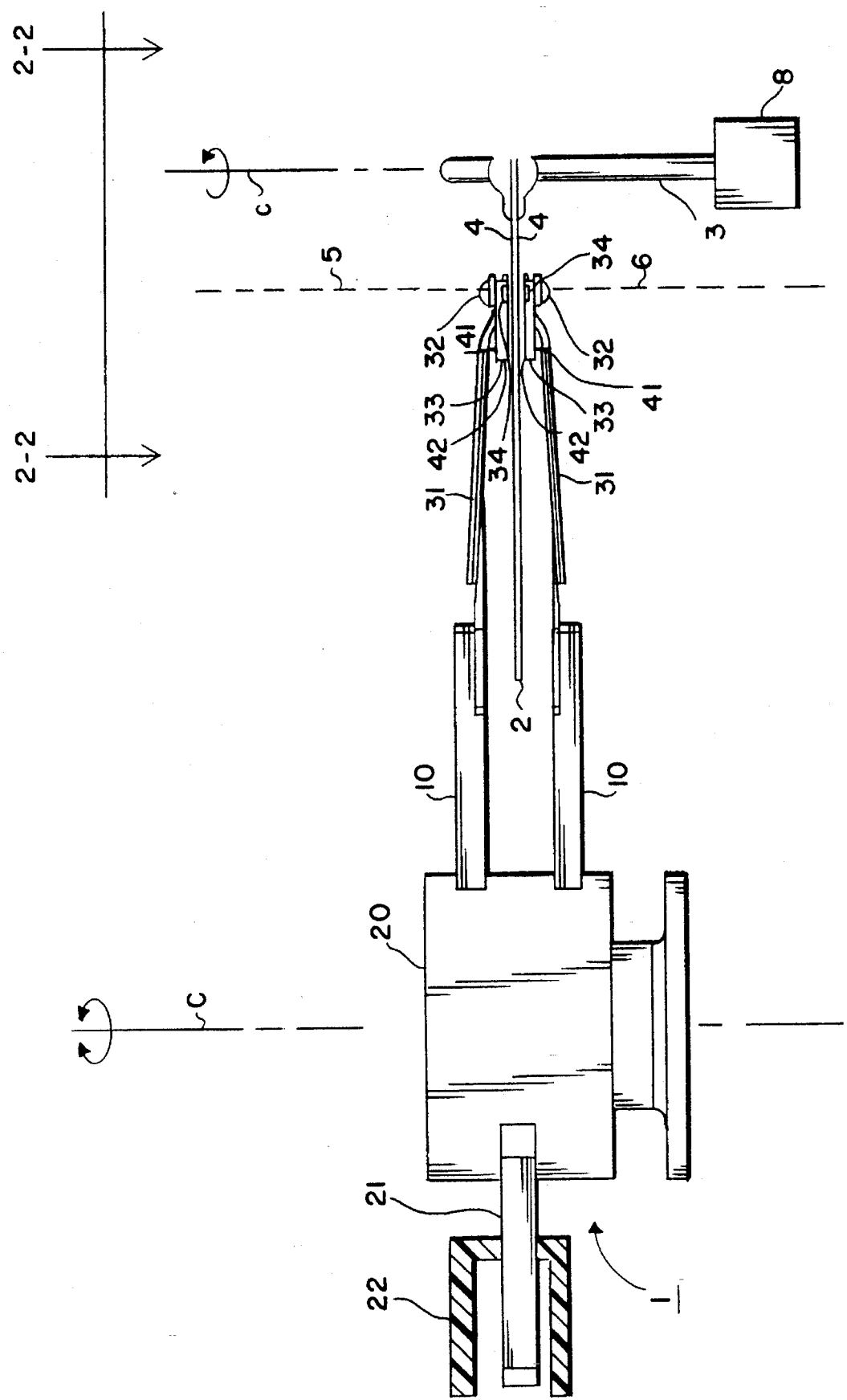
FIGS. 1 is an elevated side view of a rotary actuator and data storage disk.

FIG. 1 shows a rotary actuator 1 for use with, for example, an optical data storage disk 2. The disk 2 is mounted on a spindle 3, the spindle 3 is rotated about an axis c by an electric motor 8. A pair of light beams 5, 6 are used for accessing data on a top and bottom recording layer 4 of the disk 2.

The actuator 1, includes a pair of actuator arms 10, one for each recording layer 4. The arms 10 are fixed to a pivotable hub 20. A permanent magnet 21 is attached to the side of the hub 20 opposing the arms 10. The magnet 21 electromagnetically interacts with a conventional, fixed electrical winding 22 to pivot the arms 10 about an axis C when energized.

A head 33 is attached at the end of each of the arms 10 by a flexure 31. Each head includes a "top" surface 41 and a "bottom" surface 42.

The top surface 41 facing away from the disk 4, and the bottom surface 42 facing the disk 4.

Each head 33 also includes an objective lens 32 mounted on the top surface 41, the lens 32 for focusing the light beams 5, 6 at the corresponding recording layer 4. If the head 33 is used with magneto-optical disks, the head 33 may also include a miniature RF coil 34 mounted on the bottom surface 42, see FIGS. 2 and 4.

Figure 2:
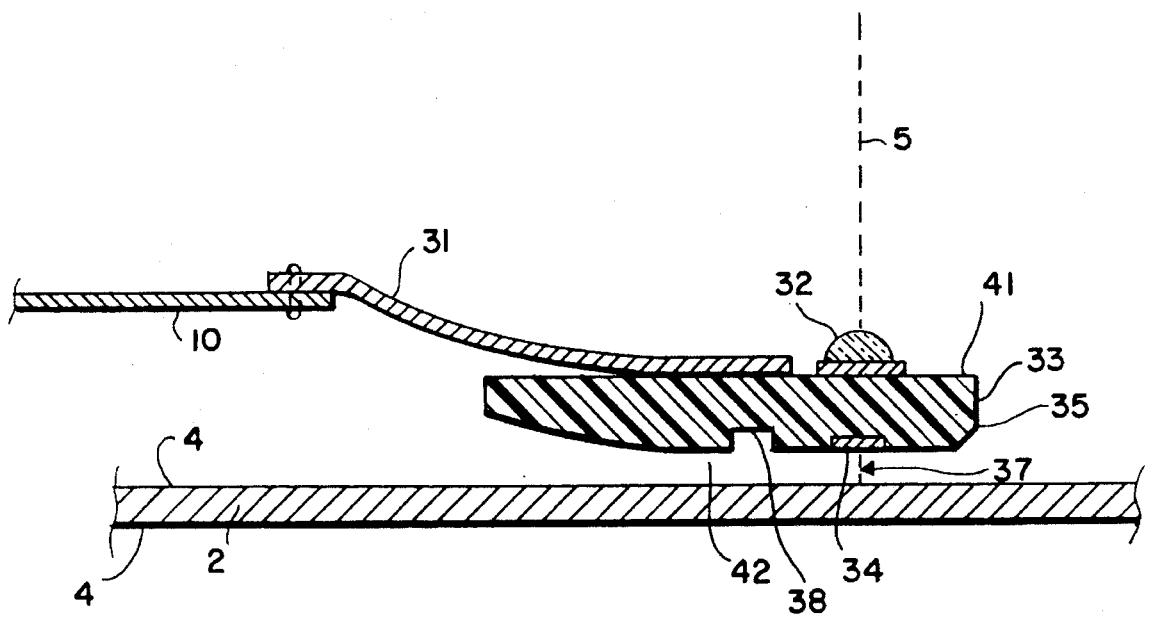
FIG. 2 is a cross-sectional view of a head along line 2—2 of FIG. 1.
Figure 4:
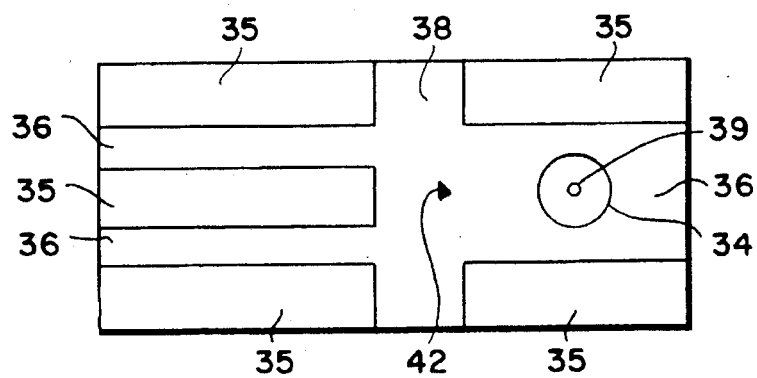
FIG. 4 is a bottom plan view of the head.
Figure 3:
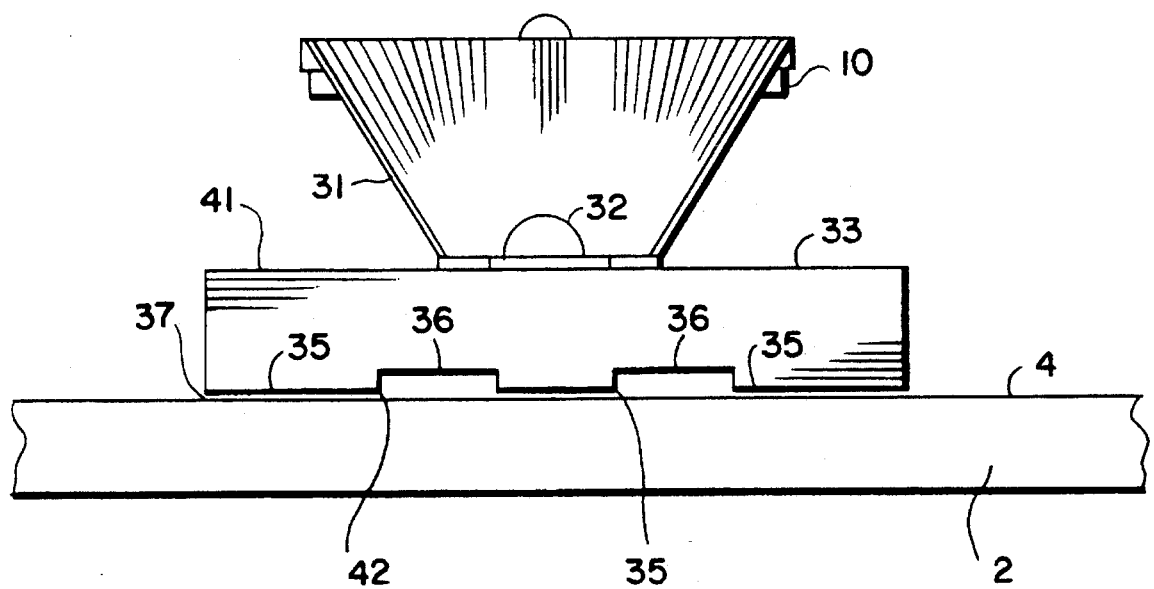
FIG. 3 is an end view of the head.

FIGS. 2, 3, and 4 show the head 33 in greater detail. The head 33, attached to the arm 10 by the flexure 31, is generally known as a "slider." The head 33, usually includes a plurality of, for example three, sloping rails 35 formed on the bottom surface 42. Grooves 36, for example two, are disposed between the rails 35. The head 33 has the general form of a trimaran or snow sled, aerodynamically dimensioned to enable the head I to fly over the disk 2 on the air-bearing bottom surface 42. An additional cross-cut groove 38 is formed at a right angle to the grooves 36. Also visible in FIG. 4 is an minute aperture 39 formed in the head 33 to permit the passage of the light beam 5.

Dust particles passing between the disk 4 and the head 33, in the gap generally indicated by reference numeral 37, can cause catastrophic head crashes damaging the disk 4 and the head 33. Dust also accumulates on the exterior surfaces of the head 33, for example in the grooves 36 and 38 and around the aperture 39 and the RF coil 34, interfering with the optical and magnetic signals used to read data.

Dust can be a particularly serious problem in data storage systems which use removable media. The insertion and removal of the disk 4 during operation are likely to introduce additional hard-to-remove dust into the environment. Also, during loading and unloading of the head 33, debris may be generated by the head 33 sliding over the recording layer 4.

Figure 5:
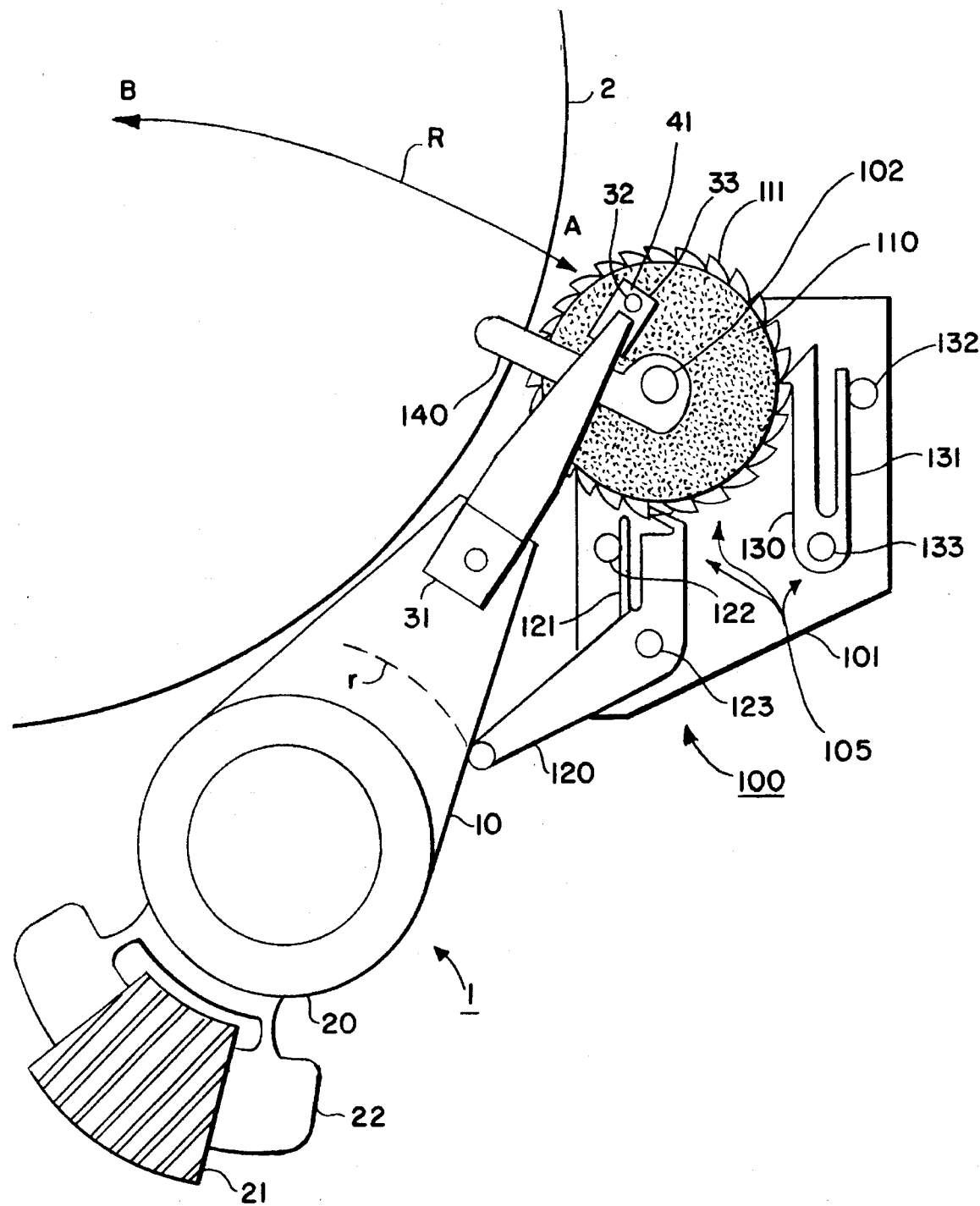
FIG. 5 is a top plan view of the rotary actuator and a cleaning apparatus.

FIG. 5 shows an embodiment of a head cleaning apparatus 100 for use with the rotary actuator 1. The cleaning apparatus 100 comprises a base 101, a pair of cleaning pads 110, and ratchet means 105 for rotating the pads 110. The base 101 is located adjacent to the disk 2 and actuator 1. Movement of the actuator 1 causes the ratchet means 105 to rotate the cleaning pads 110 as the heads 33 move across the pads 110 to clean the bottom surfaces 42 of the heads 33.

The orientation of the base 101 places the cleaning pads 110 generally in-line with the radial arc R described by the heads 33 when pivoted by the rotary actuator 1. The heads 33 travel in direction A during loading, and direction B during unloading. The cleaning pads 110 (only the top pad is visible in FIG. 5) face the heads 33. The ratchet means 105 are placed in-line with radial arc r described by the arms 10.

The ratchet means 105 is in the form of a clockwork-like escape mechanism including a toothed wheel 111, and first and second pawls 120 and 130. The wheel 111 is rotatably mounted on wheel spindle 102. Each of the pawls 120 and 130 include spring portions 121 and 131, respectively, for urging the pawls 120, 130 to engage with the teeth of wheel 111. The springs 121 and 131 are restrained by posts 122 and 132, respectively, when flexed. The pawls 120 and 130 are mounted for pivoting about pawl spindles 123 and 133, respectively. Mounted on the side surfaces of the ratchet wheel 111, and concentric therewith, are the cleaning pads 110, one for each of the heads 33.

Figure 6:
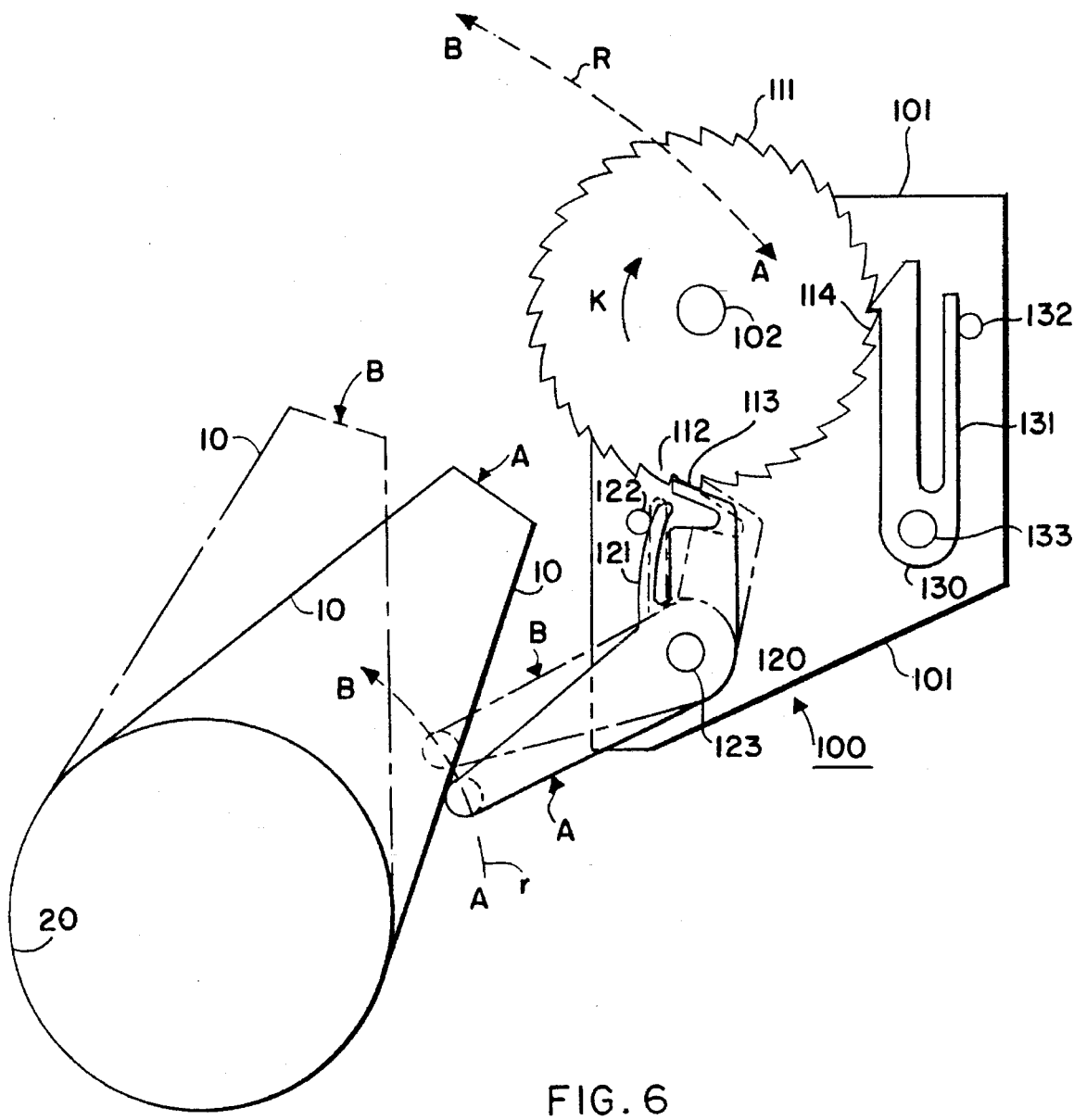
FIG. 6 is a schematic view of the actuator and cleaning apparatus.

FIG. 6 shows the positions of the parts of the actuator 1 and cleaning apparatus 100 during operation. For clarity, the disk, flexure, head, ramp, and cleaning pads are not shown in FIG. 6. The position labeled "A," shown generally in solid line, is the position of the actuator arm 10 and first pawl 120 when the heads 33 are "unloaded" for cleaning. The position labeled "B," and generally shown by dashed lines, is the position assumed by the actuator arm 10 and first pawl 120 when the heads 33 are "loaded" for reading or writing data on the disk 2.

The cleaning apparatus 100 is so positioned relative to the disk 2 and actuator 1 that the arms 10 come in contact with the first pawl 120 when the heads 33 are unloaded. (Heads 33 direction A, arc R. Arms 10 direction A arc r.) The force of the moving arms 10 pivots the first pawl 120 about its pivotal point. The pivotal movement of the first pawl 120, which is engaged with a first tooth 112 of the wheel 111, advances the ratchet wheel 111. The advancement of the wheel 111 coincides with the heads 33 moving across the cleaning pads 110 to clean the bottom surfaces 42 of the heads 33.

As the first pawl 120 is pivoted, the first pawl spring 121 is flexed and restrained by post 122. At substantially the same time, the second pawl 130 slides over, and engages with a second tooth 114. The second spring 131 ensures constant contact between the second pawl 130 and the teeth of the wheel 111.

When the heads 33 are subsequently loaded on the disk 2, the heads 33 are again wiped across the pad 110. Coincidentally, the arm 10 move along arc r in direction B, and the flexed spring 121 relaxes to return the first pawl 120 to its original position, but now engaged with a next tooth 113. Meanwhile, the second pawl 130 remains engaged with the second tooth 114 to bias the movement of the ratchet wheel 111.

Note, the heads 33 are cleaned after use during unloading, and prior to use during loading.

The apparatus 100 can also include a pair of ramps 140 for precisely positioning the heads 33 in a perpendicular position relative to the disk 2 and cleaning pads 110 during loading and unloading. The ramps 140 are placed generally in-line with the arc described by the flexures 31.

Figure 7:
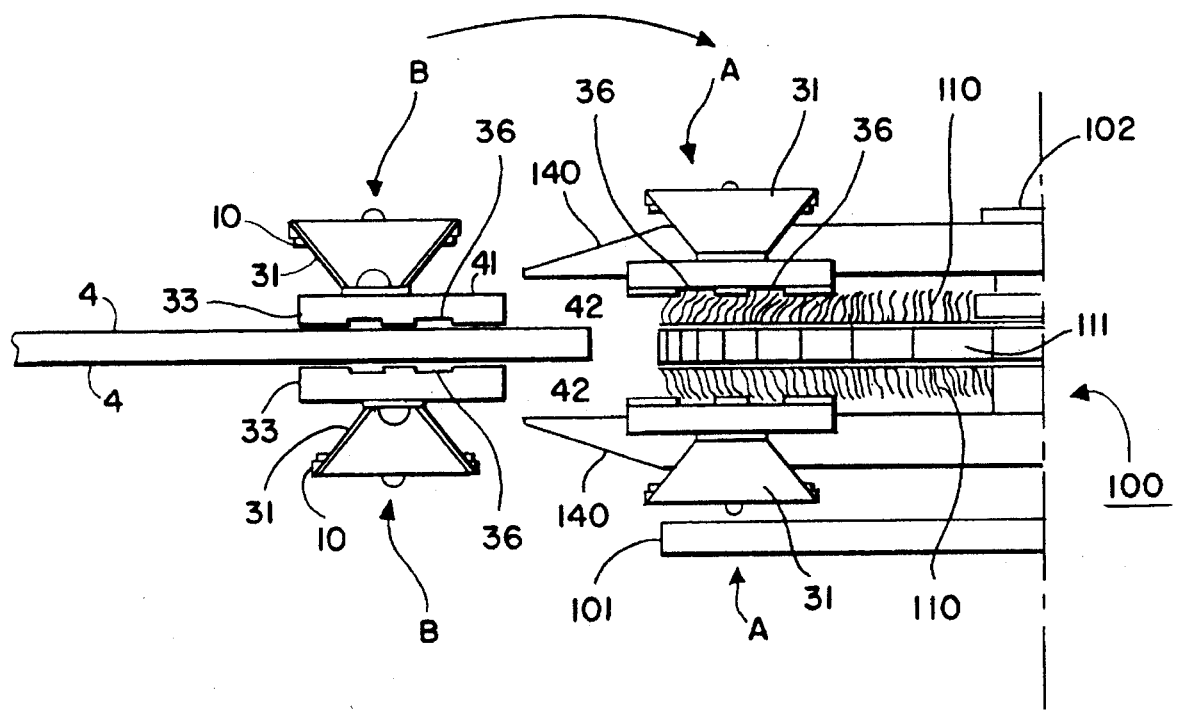
FIG. 7 is a side elevated view of the head and cleaning apparatus.

FIG. 7 shows the perpendicular positions assumed by the heads 33, relative to the disk 2 and pads 110 during operation of the cleaning apparatus 100. The "A" position is the position of the heads 33 during cleaning. The "B" position is the position of the heads 33 for reading or writing data. When the heads 33 are moved from position "B" to position "A," the ramps 140 engage with the flexures 31 to cause the heads 33 to separate from each other so that the pads 110 can clean the bottom surfaces 42 of the heads 33. As shown in FIG. 7, the pads 110 are configured as circular brushes having, for example, soft and long-wearing bristles. The bristles are made of, for example, nylon, poly-propylene, or acrylic fibers, or similar materials suitable for cleaning dust from the grooves 36 and 38 of the heads 33.

Figure 8:
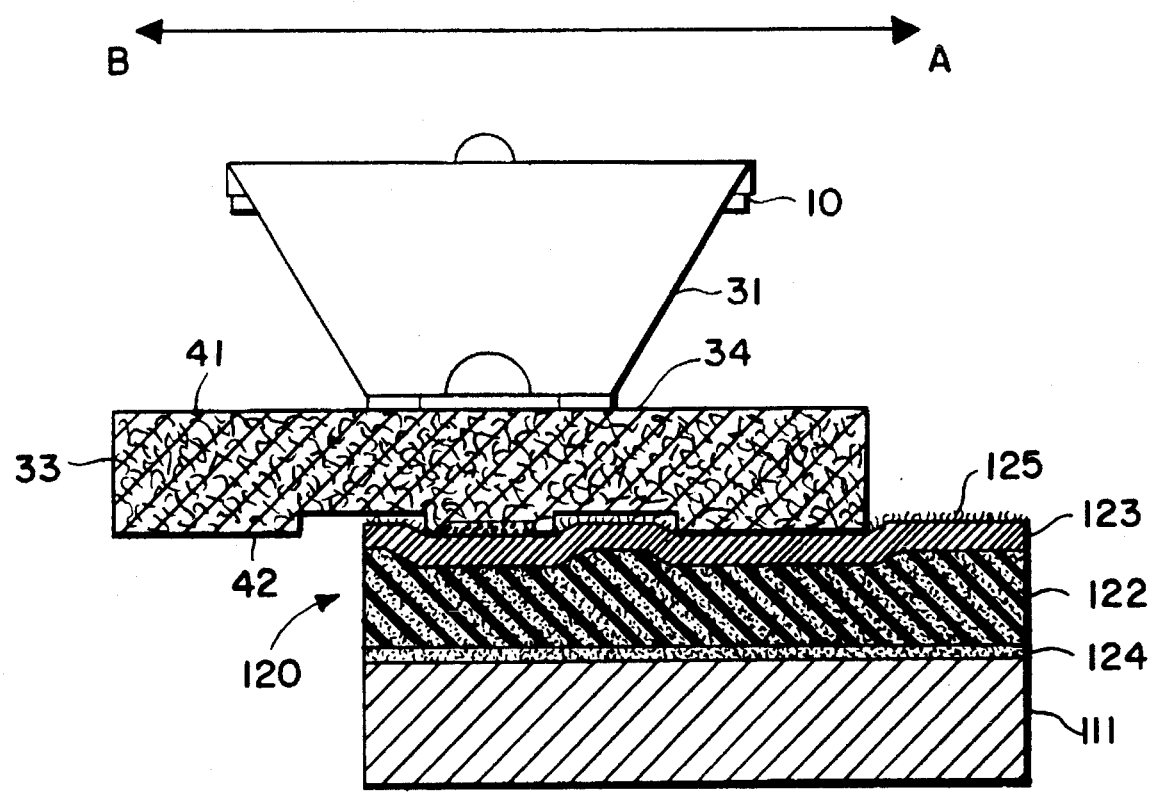
FIG. 8 is a cross-sectional view of a cleaning pad.

FIG. 8 shows an alternative configuration which can be used to make the cleaning pads 110. The pad 120 includes a foam layer 122, made of, for example, poly-urethane or poly-ethylene, and a cloth layer 123 made of a soft long-wearing material. The foam layer 122 is attached to the wheel 111 by an adhesive 124. The cloth layer 123 includes, for example, a fine nap, generally indicated by reference numeral 125. The directed double arrow labeled "B" and "A" shows the movement of the head 33 during cleaning.

Figure 9:
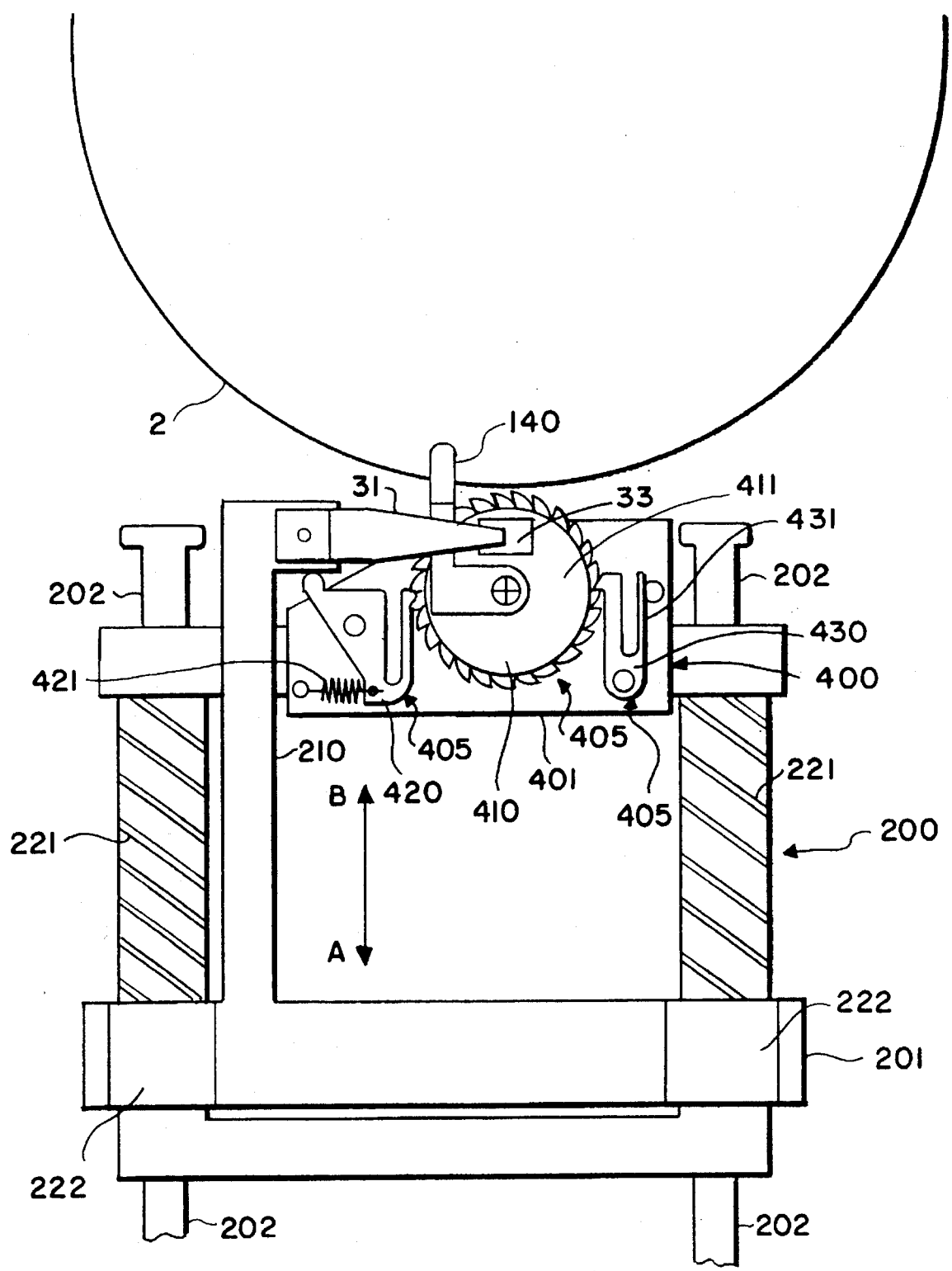
FIG. 9 is a top plan view of a linear actuator and a cleaning apparatus.

FIG. 9 shows an embodiment of the head cleaning apparatus 400 for use with a linear actuator 200. Linear actuators are well known and generally include a carriage 201 mounted on rails 202. The actuator 200 includes a pair of actuator arms 210, only the top arm 210 is visible in FIG. 9. The carriage 201 includes permanent magnets 222 to electro-magnetically interact with a conventional, fixed electrical windings 221, to linearly move the arms 210 when the windings 221 are energized. The heads 33 are attached to the free ends of the arms 210 by flexures 31.

The head cleaning apparatus 400 shown in FIG. 9 is similar to the apparatus 100 of FIG. 5. The apparatus 400 comprises a base 401, a pair of cleaning pads 410, and ratchet means 405 for rotating the pads 410. The base 401 is located adjacent to the disk 2 and actuator 200. The orientation of the base 401 places the cleaning apparatus 400 generally in-line with the linear movement of the actuator 200.

The ratchet means 405 includes a toothed wheel 411, and first and second pawls 420 and 430. Pawl 420 is attached to a spring 421, and pawl 430 includes a spring portion 431. Also, shown is the ramp 140. The operation of the apparatus 400 is essentially the same as for the apparatus 100 of FIG. 5, however the function of spring portion 121 is performed by spring 421.

Figure 10:
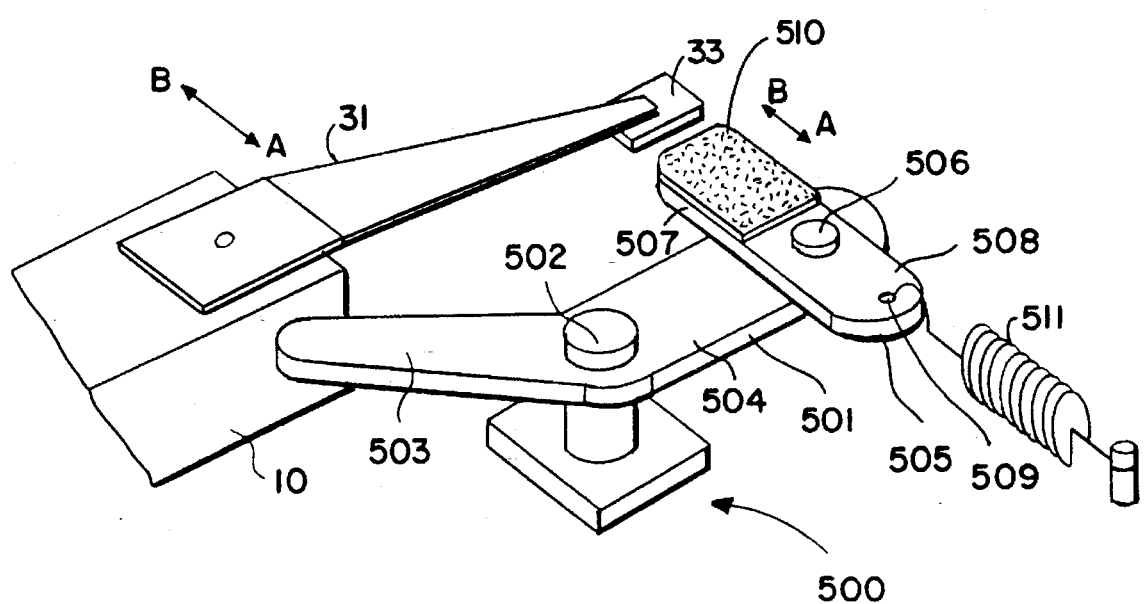
FIG. 10 is a perspective view of a pivoting cleaning pad.

FIG. 10 shows an alternative arrangement for a cleaning apparatus 500. The apparatus 500 includes a first lever 501 mounted for pivoting about a first lever post 502. The first lever 501 includes a first side portion 503 and a second side portion 504. Mounted on the second side portion 504 is a second lever 505 mounted for pivoting about a second lever post 506. The second lever post 506 is mounted on the second side portion of the first lever 501. The second lever 505 has a first end 507 and a second end 508. A cleaning pad 510 is mounted on the first end 507 of the second lever 505. The construction of the cleaning pad 510 is similar to the pads 110 and 120 shown for FIGS. 7 and 8. The second end 508 includes a throughhole 509. One end of a spring 511 is inserted in the throughhole 509. The other end of the spring 511 is attached to spring post 512.

Figure 11:
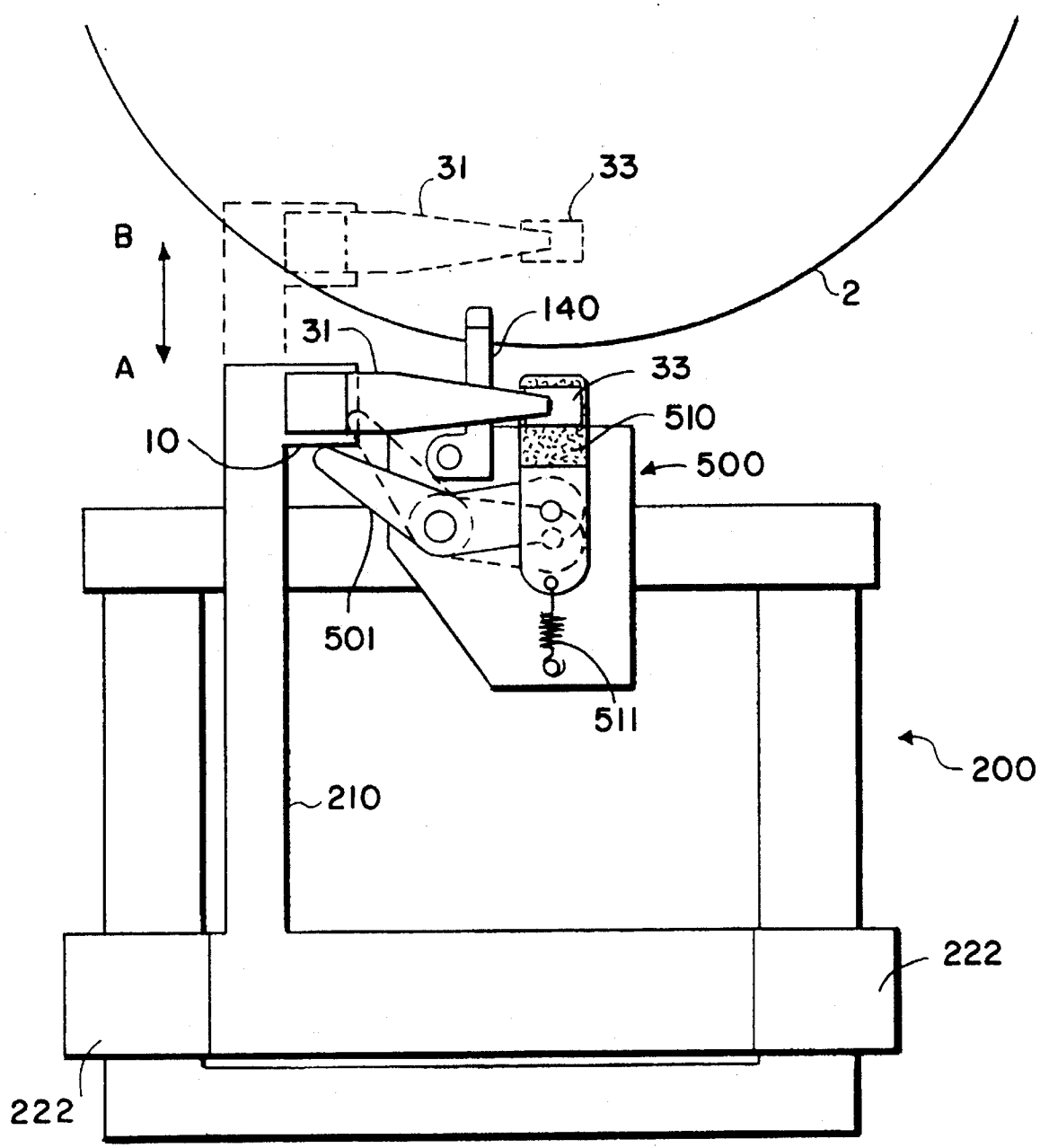
FIG. 11 is a schematic view of the pivoting cleaning pad used with a linear actuator.

FIG. 11 shows the operation of the cleaning apparatus 500 in conjunction with the linear actuator 200 as described with respect to FIG. 9. Essentially, the linear motion of the actuator 200 rocks the first lever 501 back and forth so that the pad 510 can wipe the head 33 clean. The force of the arm 10 moving in direction A rocks the lever in direction B while lengthening spring 511. When the arm 10 moves in direction B during loading, the stored force in spring 511 moves the pad 510 in direction A back to its original position. Since the planar surface of the second lever 505 is fixedly supported on the planar surface of the first lever 501, the cleaning pan 510 and the second lever 508 maintain substantially constant relative planarity with the head during the cleaning and non-cleaning operation.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

What is claimed is:

1. A head cleaning apparatus, comprising:

a base;

a read/write head;

a disk rotatably journalled to the base;

an actuator movably mounted relative to the base and carrying said head in operable relationship with the disk, movement of said actuator for positioning said head relative to said disk and for placing said head into a cleaning contact relationship with a cleaning pad;

a substantially V-shaped lever having a first end and a second end, said substantially V-shaped lever being pivotably mounted to the base along an outer periphery of the disk such that the substantially V-shaped lever pivots about a pivot axis located intermediate the first end and the second end when the actuator contacts the first end of the substantially V-shaped lever upon unloading the read/write head from the disk;

a middle portion of a planar element pivotally mounted on the second end of the substantially V-shaped lever;

the cleaning pad mounted at one end of the planar element such that as the actuator unloads the read/write head from the disk and contacts and pivots the substantially V-shaped level the cleaning pad moves into cleaning contact relationship with the head; and a spring connected to the planar element at an end opposite from the cleaning pad, said spring biasing the planar element and the cleaning pad away from the cleaning contact relationship as the actuator loads the head onto the disk and releases contact with the first end of the substantially V-shaped lever.

2. The apparatus as in claim 1 further including a mounted ramp perpendicularly positioning said head relative to said cleaning pad.

3. The apparatus as in claim 1 wherein said head includes an airbearing grooved surface to be cleaned by said cleaning pad.

4. The cleaning apparatus of claim 1 wherein said cleaning pad maintains substantially constant relative planarity with said head during said cleaning contact relationship.

5. A head cleaning apparatus comprising:

a base;

a read/write head;

a disk rotatably journalled to the base;

an actuator movably mounted relative to the base and carrying said head in operable relationship with the disk, movements of said actuator for positioning said head relative to said disk and for placing said head into a cleaning contact relationship with a cleaning pad;

a substantially V-shaped lever having a planar surface and a first end and a second end, said substantially V-shaped lever being pivotally mounted to the base along an outer periphery of the disk such that the substantially V-shaped lever pivots abort a pivot axis located intermediate the first end and the second end when the actuator contacts the first end of the substantially V-shaped lever upon unloading the read/write head from the disk;

a middle portion of a planar element pivotally mounted on the second end of the substantially V-shaped lever, on said planar surface;

the cleaning pad mounted at one end of the planar element, such that as the actuator unloads the read/write head from the disk and contacts and pivots the substantially V-shaped lever, the planar element and the cleaning pad move into cleaning contact relationship with the head such that the planar element and the substantially V-shaped lever maintain coplanarity relative to the head during the cleaning relationship; and a spring connected to said planar element at an end opposite from the cleaning pad, said spring biasing the planar element and the cleaning pad away from the cleaning contact relationship, while maintaining coplanarity between the planar element and the substantially V-shaped lever, as the actuator loads the head onto the disk and releases contact with the first end of the substantially V-shaped lever.

* * * * *